Sept. 18, 1956      A. FEROY      2,763,329
VARIABLE PITCH PROPELLER
Filed Aug. 26, 1953      2 Sheets-Sheet 1
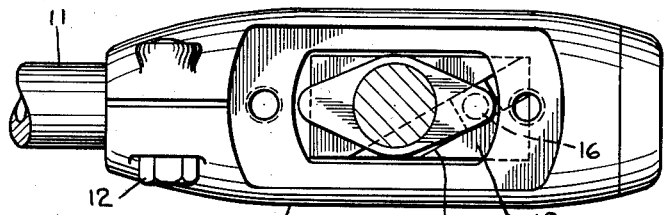
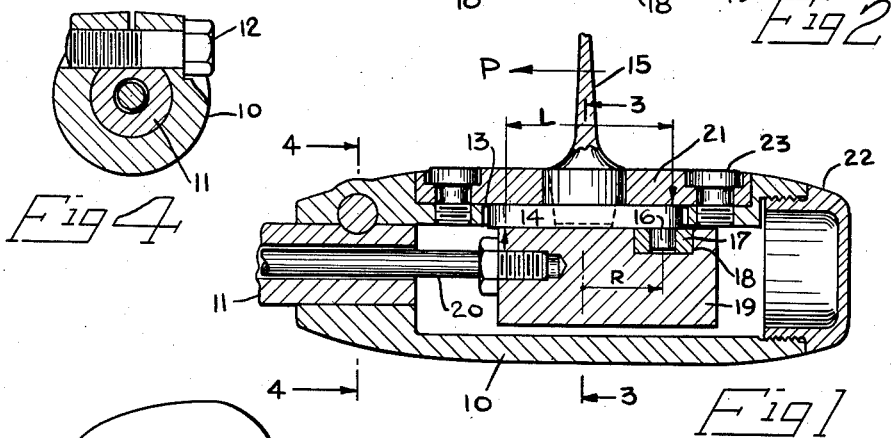
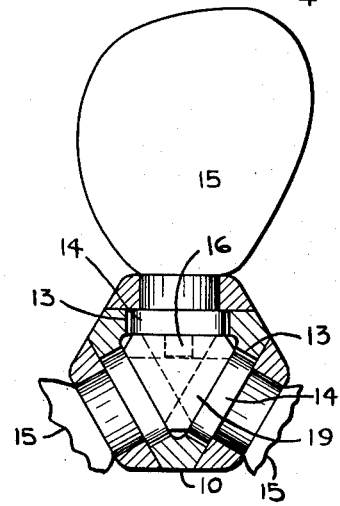
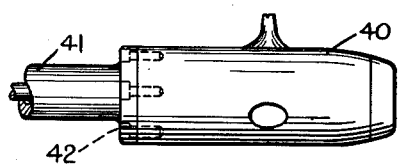
INVENTOR.
Arne Feroy
BY Edwin S. Hall
Atty.

Sept. 18, 1956        A. FEROY        2,763,329

VARIABLE PITCH PROPELLER

Filed Aug. 26, 1953        2 Sheets-Sheet 2

INVENTOR.
Arne Feroy
BY Edwin S. Hall
Atty.

United States Patent Office 2,763,329
Patented Sept. 18, 1956

2,763,329
VARIABLE PITCH PROPELLER
Arne Feroy, Kent, Wash.

Application August 26, 1953, Serial No. 376,540

10 Claims. (Cl. 170—160.47)

This invention relates to variable pitch propellers for marine use especially. This application is a continuation in part of my copending application, Ser. No. 306,471 filed August 26, 1952, now abandoned.

An object of this invention is to provide a practical, compact, and durable hub construction for reversible pitch propellers in which the specific loadings on the bearing parts will be lower than those in known constructions. It is known to provide a flange for each propeller blade, the flange elongated, not circular, the flange diameter normal to the midplane of the blade faces being long enough to support the blade thrust moment without undue loading, the flange diameter parallel to the blade faces being shorter to permit a more compact and smaller hub. Moreover, it is known to provide a control rod axially movable or rotatable relative to the propeller shaft. An object of this invention is to provide an operable connection between an axially movable control member and points toward the ends of the longer diameter of the blade flange, to permit turning the blade with low loadings on the bearing surfaces. Another object is to provide an operable connection so constructed and arranged that all bearing loads will be carried by adequate bearing surfaces rather than on line contacts, to insure low specific bearing loadings.

Structures are known in which a pair of cam slots in an axially movable control member engage, with line contacts, a pair of pins toward the ends of a diameter of the blade flange. It is obvious that one cam slot must be geometrically conjugate to the other to avoid jamming. Since the axial component of the motion of one of the flange pins is in the same direction as the motion of the control rod while the axial component of the motion of the other flange pin is in the opposite direction, geometrically conjugate slots cannot be identical in curvature. Moreover, if one slot is uniform in curvature, a circular arc or straight, the other slot must necessarily be nonuniform in curvature, precluding the use of sliding blocks pivoted on the pins. In such case, the pins must bear directly on the walls of the slots with line contacts. An object of this invention is to avoid line contacts by providing a self-aligning cam plate laterally movable relative to the axially movable control member, the cam slots being either straight or circular arcs, and angularly located only approximately in the positions of a pair of geometrically conjugate slots, permitting the use of sliding blocks pivoted on the pins and operable in the slots with surface contacts, to turn the blade without any possibility of jamming and with low specific bearing loadings.

Other objects are to provide improved means for reversing the pitch of the propeller, and to provide a construction that is simple, rugged, and easy to manufacture.

These and other objects of the invention will be apparent from the following description in connection with the drawings, in which:

Fig. 1 is a longitudinal section thru the propeller hub;

Fig. 2 is a plan view of Fig. 1 showing the hub with plate 21 removed;

Fig. 3 is a transverse section on the plane 3—3 of Fig. 1;

Fig. 4 is a transverse section on the plane 4—4 of Fig. 1;

Fig. 5 is a sketch of another way to fasten the propeller hub to its shaft;

Figure 6:
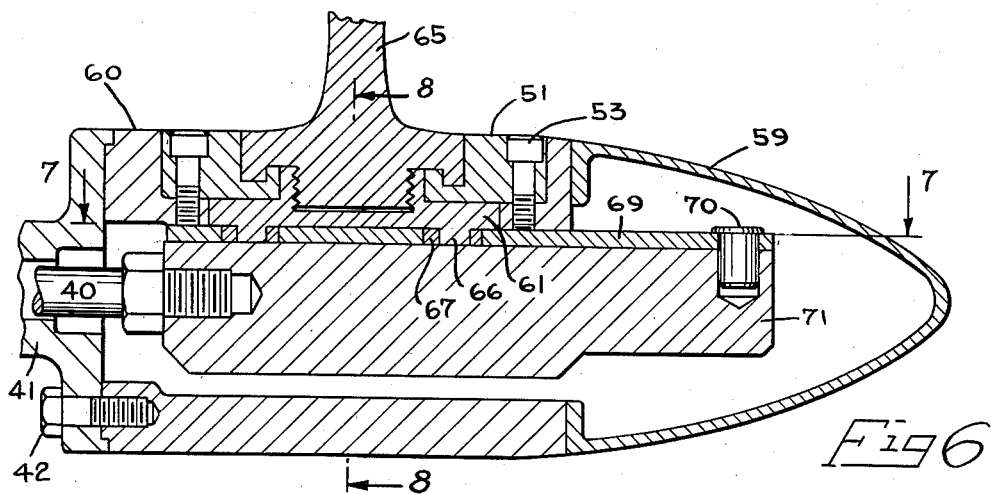
Fig. 6 is a longitudinal section thru the propeller hub of preferred structure.

Referring to the drawings, propeller hub 10 is locked to shaft 11 by clamp screw 12, or it might be bolted onto a flange on the shaft as shown in Fig. 5. Hub 10 is provided with sockets 13, each of which may receive flange 14 of blade 15. Before blade 15 is fixed to flange 14 as by brazing or any other well-known manner, plate 21 is operably assembled on flange 14.

Pin 16 is fixed in one end of flange 14, and is operable in sliding block 17, adapted to slide in groove 18 of control block 19 which may be moved axially within hub 10 by pull rod 20, axially movable within shaft 11 by any suitable control means. The working space within hub 10 is closed by cup 22 after assembly of control block 19 and pull rod 20.

When assembled, plates 21 are secured to hub 10 by screws 23.

In operation, the thrust load on blade 15, designated by the arrow P, is substantially normal to the face of the blade and in the plane of the longer diameter of blade flange 14. This force P must be resisted by a couple acting on flange 14. The longer the couple arm L, the lower the loads on control block 19 and cover 21. By making flange 14 longer in the direction normal to blade 15, and shorter in the direction parallel to blade 15, coupled arm L can be long enough to keep the loading down without making hub 10 unduly large and awkward since the diameter of flange 14 in the plane of blade 15 can be quite short.

In operation, axial movement of pull rod 20 and control block 19, by any suitable means, from the neutral position shown, will swing blades 15 on their several axes by the coaction of grooves 18, sliding blocks 17, and pins 16, to turn the blades into forward or reverse position at the will of the operator, the loadings on pins 16 being lower than if the pins were on the shorter diameters of the blade flanges and nearer to the blade axes. Thus one of the objects of the invention is attained in a practical manner.

Figure 7:
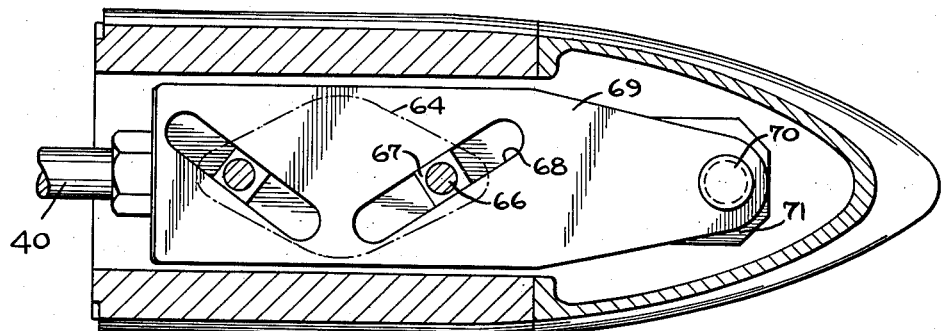
Fig. 7 is a plan view partly in section on the line 7—7 of Fig. 6.
Figure 8:
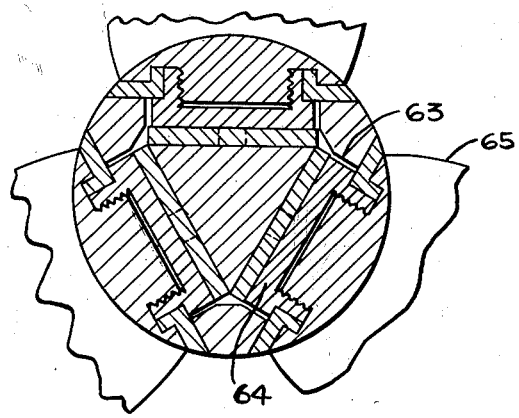
Fig. 8 is a transverse sectional view on the line 8—8 of Fig. 6.

The structure would be more durable and the loads on the control mechanism would be less if the blades were turned by couples. Referring to Figs. 6-8, propeller hub 60 is fastened to shaft 41 by screws 42. Hub 60 is provided with sockets 63, each of which may receive flange 64 of blade 65. Before blade 65 is fastened to flange 64 in any well-known manner, plate 51 is operably assembled on flange 64.

Flange 64 is elongated in the direction normal to the faces of blade 65. Pins 66 are fixed in or integral with flange 64 and are located at opposite ends of the long diameter of flange 64. Pins 66 operably engage sliding blocks 67 which coact with slots 68 in plate 69. Plate 69 is pivoted on pin 70 which is carried by control block 71.

Control block 71 may be moved axially to change the pitch of the propeller in any well-known manner as by pull rod 40 within drive shaft 41. Plates 51 are fastened to hub 60 by screws 53, and the working chamber within hub 60 may be closed by cap 59 fastened to hub 60 in any way desired.

In operation, axial movement of control block 71 is transmitted by pin 70 to plate 69 whose cam slots 68 transmit the motion to sliding blocks 67 and pins 66 to rotate blade 65. The motion of pivot pin 70 is axial to shaft 41; the motion of flange pins 68 is circular about an axis normal to shaft 41. Cam plate 69 pivoted to control block 71 is not shown in the prior art; this self-aligning cam plate is a novel feature of this invention. If pivoted cam plate 69 were omitted and slots 68 were formed directly in control block 71 (the structure shown in the prior art), slots 68 would necessarily have to be geometrically conjugate. Geometrically conjugate slots are neither identical nor uniform in curvature because the axial component of the motion of one pin 66 is in the same direction as the axial motion of control block 71 while the axial component of the motion of the other pin 66 is in the opposite direction. In this invention, slots 66 may be identical and straight, as shown, or identical circular arcs, and positioned only approximately at the angles of geomtrically conjugate slots, with no possibility of jamming, since cam plate 69 is free to move laterally to suit the instant positions of flange pins 66. Since cam slots 68 may be straight or circular arcs of uniform curvature, sliding blocks 67 may be used to reduce the specific loadings and provide a more durable mechanism than when the flange pins have only line contact with the walls of nonuniformly-curved geometrically conjugate slots.

Having thus described, the invention, it is obvious that the objects as stated have been attained in a practical manner. While certain specific embodiments of the invention have been shown and described, is understood that changes may be made in the construction and arrangement of the various parts without departing from the spirit or scope of the invention as expressed in the following claims.

I claim:

1. In a variable pitch propeller, a hub, a propeller blade radial to said hub, a flange on said blade, said flange of elongated shape, its longer diameter substantially normal to the faces of said blade and its shorter diameter substantially parallel to the faces of said blade, and mechanical means for rotating said flange and blade to change the pitch of said propeller to any desired position, forward, neutral, or reverse; said mechanical means including a control member axially movable in said hub, a cam plate having a mechanical connection with said control member whereby said cam plate is laterally movable relative to said control member, a pair of slots in said plate, a pair of pins on said flange and located toward opposite ends of said longer diameter, and a pair of blocks pivoted on said pins and operably slidable in said slots.

2. Structure as claimed in claim 1, said slots being straight.

3. Structure as claimed in claim 1, said slots being arcs of constant curvature.

4. In a variable pitch propeller, a hub, a propeller blade radial to said hub, a flange on and substantially normal to said blade, and means for rotating said flange and blade to change the pitch of said propeller, said means including a control member axially movable in said hub, a cam plate having a mechanical connection with said control member whereby said cam plate is laterally movable relative to said control member, cam slots in said plate, a pair of pins on said flange, and a pair of blocks pivoted on said pins and operably slidable in said slots.

5. In a variable pitch propeller, a hub, a propeller blade radial to said hub, a flange on and susbtantially normal to said blade, and means for rotating said flange and blade to change the pitch of said propeller, said means including a control member axially movable in said hub, a cam plate pivoted to said control member, cam slots in said plate, a pair of pins on said flange, and a pair of blocks pivoted on said pins and operably slidable in said slots.

6. In a variable pitch propeller, a hub, a propeller blade operably mounted radial to said hub, a flange on and substantially normal to said blade, and means for rotating said flange and blade to change the pitch of said propeller, said means including a control member axially movable in said hub, a cam plate having a mechanical connection with said control member whereby said cam plate is laterally movable relative to said control member, cam slots in said plate, and a pair of pins toward opposite ends of a diameter of said flange, said pins coacting with said slots.

7. Structure as claimed in claim 6, said slots being straight.

8. Structure as claimed in claim 6, said slots being arcs of constant curvature.

9. In a variable pitch propeller, a hub, a propeller blade radial to said hub, a flange on said blade, said flange of elongated shape, its longer diameter susbtantially parallel to the faces of said blade, and mechanical means for rotating said flange and blade to change the pitch of said propeller to any desired position, forward, neutral, or reverse; said mechanical means including a control member axially movable in said hub and a self-aligning cam plate having a mechanical connection with said control member whereby said cam plate is laterally movable relative to said control member, a pair of diagonal slots in said plate, a pair of pins on said flange and located toward the ends of said longer diameter, and a pair of sliding blocks pivoted on said pins and operably slidable in said slots.

10. In a variable pitch propeller, a hub, a propeller blade radial to said hub, a flange on said blade, said flange of elongated shape its longer diameter substantially parallel to the faces of said blade, and mechanical means for rotating said flange and blade to change the pitch of said propeller to any desired position, forward, neutral, or reverse; said mechanical means including a control member axially movable in said hub and a laterally movable cam plate having a mechanical connection with said control member whereby said cam plate is laterally movable relative to said control member, a pair of slots in said plate, and a pair of pins located toward opposite ends of said longer diameter on said flange, said pins operably coacting with said slots.

References Cited in the file of this patent

UNITED STATES PATENTS

| Re. 12,665 | Perkins | June 25, 1907 |
| 1,857,319 | Monroe | May 10, 1932 |
| 2,517,714 | Roesch | Aug. 8, 1950 |
| 2,620,040 | Nichols | Dec. 2, 1952 |

FOREIGN PATENTS

| 760 | Great Britain | Jan. 11, 1907 |